United States Patent
Sherman et al.

(10) Patent No.: US 6,434,513 B1
(45) Date of Patent: Aug. 13, 2002

(54) METHOD OF LOAD TESTING WEB APPLICATIONS BASED ON PERFORMANCE GOAL

(75) Inventors: Yahali Sherman; Uri Hare'l, both of Tel Aviv (IL); Ilan Kinreich, Lexington, MA (US)

(73) Assignee: Radview Software, Ltd., Tel Aviv (IL)

( * ) Notice: Subject to any disclaimer, the term of this patent is extended or adjusted under 35 U.S.C. 154(b) by 0 days.

(21) Appl. No.: 09/199,592

(22) Filed: Nov. 25, 1998

(51) Int. Cl.[7] ................................................ G06F 11/34
(52) U.S. Cl. ..................... 702/186; 702/182; 702/187; 703/21; 703/22; 709/223; 709/224; 714/47
(58) Field of Search ................................ 702/182–189, 702/108, 119–125, 177–179, 127, FOR 103, FOR 104, FOR 134, FOR 135, FOR 139, FOR 141, FOR 154, FOR 155, FOR 170, FOR 171; 703/21, 13, 19, 22, 20; 709/223, 224, 105; 714/39, 47, 51, 37; 710/17, 18; 370/254

(56) References Cited

U.S. PATENT DOCUMENTS

| | | | | |
|---|---|---|---|---|
| 5,812,780 A | * | 9/1998 | Chen et al. ................... | 709/224 |
| 5,956,662 A | * | 9/1999 | Hemker et al. ............. | 702/182 |
| 5,974,572 A | * | 10/1999 | Weinberg et al. ............. | 714/47 |
| 6,249,886 B1 | * | 6/2001 | Kalkunte ....................... | 714/47 |

OTHER PUBLICATIONS

Understanding and Using ServerBench 4.01, 1997 by Ziff–Davis Inc. Chapter 3: The Concept Behind Server Bench.
SPECweb96, A benchmark for Web Server Performance—A white paper by SPEC, 16 pages, (No month).
Microsoft, "Microsoft® Web Capacity Analysis Tool Technical Specification", 11 pages, dated (1997). (No month).
Gene Trent and Mark Sake, "WebSTONE: The First Generation in HTTP Server Benchmarking", *Silicon Graphics*, 23 pages, dated Feb. 1995.
Microsoft, "Microsoft® Web Capacity Analysis Tool, Version 3.1", 59 pages, dated Sep. 24, 2001.
Andy Hoetzel et al., "Benchmarking in Focus", *IBM*, 175 pages, dated Mar. 1998.
Standard Performance Evaluation Corporation, "SPECweb96 Release 1.0 Run and Reporting Rules", 8 pages, dated Mar. 27, 1997.
Robert B. Denny, "Website Performance Analysis", 4 pages, dated May 26, 1996.
Ziff–Davis Inc., "The WebBench™ Tester's Handbook", version 2.0 dated Apr. 1998.
Mercury Interactive Corporation, "Astra Site Test User's Guide", dated 1996. (No month).
Radview Software Ltd. "The WebLoad User Guide", version 2.0, dated August 1997.

\* cited by examiner

*Primary Examiner*—Hal Wachsman
(74) *Attorney, Agent, or Firm*—Fulbright & Jaworski LLP

(57) ABSTRACT

A computer-based method for load testing a web application to determine the web application's full capacity using a plurality of load generators. The computer-based method comprises generating a load on the web application using at least one load generator and measuring the transactions per second (TPS) and application response time (ART) in real time. Another load generator is selected to dynamically increase the load on the web application if there is no increase in the TPS and the ART, thereby indicating that the load generator is at full capacity. However, if there is an increase in ART but no increase in the TPS with the increasing load, then the load testing is terminated since this indicates that the web application is at full capacity.

4 Claims, 2 Drawing Sheets

METHOD OF LOAD TESTING WEB APPLICATIONS BASED ON PERFORMANCE GOAL

BACKGROUND OF THE INVENTION

This invention relates to the simulation of loading a web application and, more particularly, to the simulation of a loading of a web application by clients accessing the web application.

Communication of data from a central repository of data such as an Internet or Intranet to numerous persons referred to as clients is accomplished by use of a web application interconnected via a communication system to the clients. The specific resource requirements upon the web application for processing a client's request for data depend on the nature of the data requested by the client, and, therefore, the loading of the web application by the client varies upon the clients. The total load on the web application increases with the number of clients accessing the web application and, with a large number of clients, may exceed the operating capacity of the web application in terms of meeting a/many performance goal/s. Such performance goals may be measured in terms of transactions per second (TPS), average response time, number of clients being served, CPU utilization or other.

To provide good service to the clients by the web application, there is a need to know the capacity of the web application in terms of the number of clients which can be served and/or how close the web application is to its capacity limit. To conduct such an analysis of a web application, equipment known as load generators have been developed to simulate the load generated by clients upon the web application. To simulate a large number of clients, there is employed a load generation system wherein one or more computers function as load generators to simulate the multiplicity of clients, such as personal computers, which may access the web application.

Presently available web application testing does not adequately address the foregoing need for knowledge of the web application capacity.

SUMMARY OF THE INVENTION

The foregoing need is met and other advantages are provided, in accordance with the invention, by a procedure of monitoring the performance of the web application while adapting the load generation for testing the web application performance. The invention provides for an increasing of the load upon the web application, while monitoring the transactions per second (TPS), this being followed by a further increase in the loading with a monitoring of the response time. During this procedure, there is a checking of whether the web application has reached a determined performance goal. If the performance goal is attained, the procedure terminates because no further performance is anticipated. The procedure also involves steps performed to determine whether a load generator, used in the loading of the web application, has reached its limit.

It is advantageous to designate a single client machine, to be referred to as a probing client, to simulate a single client obtaining of data from the web application. The monitoring of the performance characteristics of the web application by the probing client serves as an accurate measure of the web application performance.

In the simulation of the load imposed by simulated client, there is a creation of a test script that defines the behavior of the simulated clients. A user of the load generation system can set in advance the number of simulated clients for each load generator in order to determine the load size. The load size and its distribution on the load generators can be set to different values for different periods of the test.

The logic for interpreting the measurements is as follows. If the load size on a given load generator has increased, and its TPS remains steady, then there are two possibilities. The first possibility is that the load generator has reached its full capacity, and therefore the load increase actually interferes with the operation of the load generator. As a second possibility, the application being tested (ABT) has reached its full capacity and cannot produce more TPS. In order to determine which of these possibilities has occurred, two indicators are used.

The first indicator is the measurement of the response time, as taken from the probing client. If the response time does not change in value upon an increase in the load, this is understood to indicate that the ABT has not experienced a change in load size. Because, otherwise, the TPS would also have increased. Thus, the load generator is operating at full capacity. If the response time increases as the load increases, this is understood to mean that the ABT is unable to process more requests and, therefore, any further increase in the load size will affect the time, namely the response time, which is required to complete each request. A further indicator is found in the act of increasing the load on a different one of the load generators. If the TPS experiences an increase, this means that the ABT has successfully processed the additional request and, therefore, the first of the load generators has reached its full capacity and, accordingly, is not able to produce additional effective requests.

Definitions

Central Console

The central console delivers centralized management of all testing functions including selecting and defining test sessions, developing test scripts, scheduling test sessions and graphically and statistically monitoring results.

The Central Console

Configures test sessions.

Schedules test session scripts for simulated clients and probing clients.

Monitors the application's performance under the generated load.

Manages the test session as it is running

Displays the performance of the ABT

ABT (Application Being Tested)

The web application being tested

Load Generator

An entity that generates simulated clients. Load generators have the task of bombarding the application being tested with HTTP protocol call requests as defined in the scripts. The number of simulated clients at any given moment is determined by the user-defined session.

Load Generator Machine

The machine that hosts and runs one or multiple load generators. Load generator machines are not limited to running a single load generator.

Probing Client

An entity that simulates only one client at any time. A probing client can run at the same time as loading testing. Probing clients are used to obtain performance measurements that can be more exact than a load generator machine running many simulated clients.

Probing Client Machine

A machine that hosts and runs a probing client. Probing client machines typically only run and host a single probing client.

Simulated Clients

Entities generated by load generators and probing clients. Each such entity is a simulation of a client accessing the application being tested (ABT).

Clients

Persons or entities which access a website via a browser or equivalent.

TPS (Transactions Per Second)

The number of HTTP transactions (such as a Get or Post) submitted by a clients to the ABT in a defined time period, divided by the number of seconds in the time period.

ART (Application Response Time)

The time (in seconds) required for the ABT to respond to a request sent by a client, simulated client or probing client).

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element but may not be referenced in the description for all figures.

DETAILED DESCRIPTION OF THE INVENTION

Figure 1:
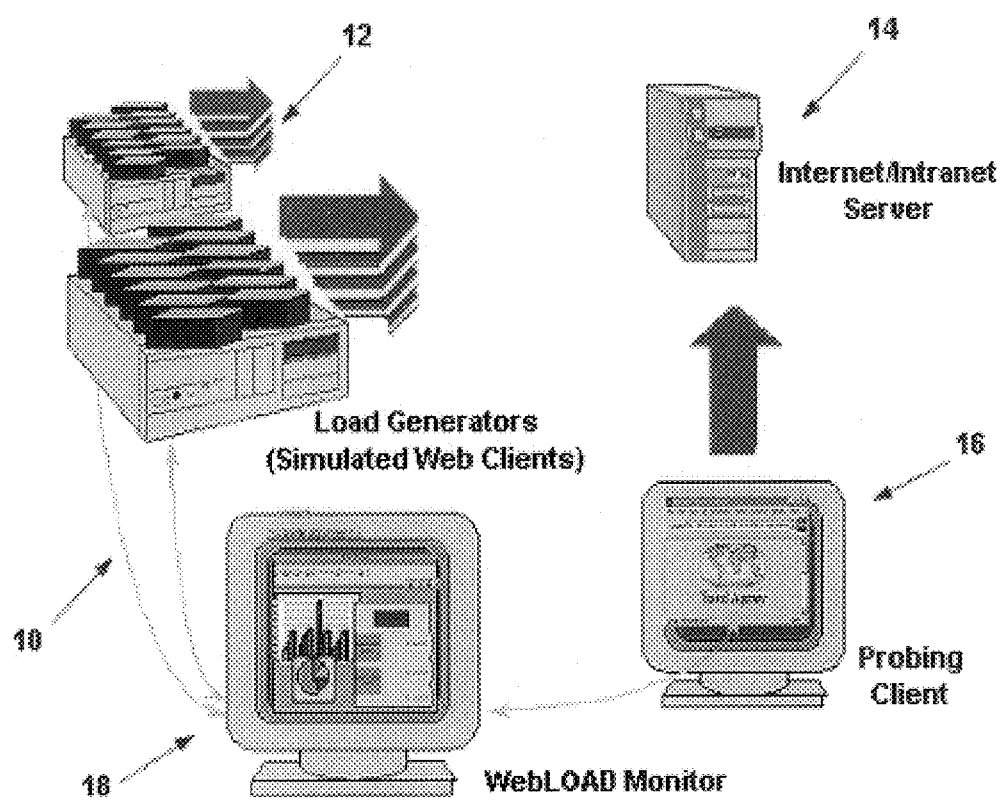
FIG. 1 is a stylized view of a test system for conducting the procedure of the invention.

In FIG. 1, a web application load testing system 10 comprises a plurality of load generators 12 which simulate the loading of clients, the load generators 12 applying loads to a web application 14. Loading of the web application 14 is also provided by a probing client 16. The performance of the web application in handling requests of the load generators 12 and of the probing client 16 are evaluated by a Central Console 18. The system 10 is operated in accordance with the procedure of the invention, as will be described hereinafter with reference to FIG. 2, to establish the capacity of the web application to process data requests of numerous clients serviced via the web.

In establishing the capacity of the web application, a question arises in the use of the load generation system 10 as to how many simulated clients can be run on each of the load generators 12. By way of example, one may decide, theoretically, to run 10,000 such clients on a single machine, however the machine may not perform the task adequately because each client consumes an amount of system resources, which resources are limited. Even if one could calculate in advance how many resources each simulated client would consume, the capacity of the load generator 12 could not be determined simply by dividing the system resources by the number of the clients. This is because modem operating systems allow processes to compete over resources. Accordingly, there is need to find out how many simulated clients can be run on a given machine while utilizing its full capacity of resources, without interference among the responses to the respective clients.

A further consideration in the implementation of the invention is the capacity of the web application, namely, how many clients can access the web application until the web application reaches a predefined limit or performance goal (in terms of response time or other performance metrics). The load generation system 10 addresses these considerations by implementation of the procedure of the invention wherein the loading of the number of clients is simulated by the load generators without requiring a generator to exceed its capacity. In addition, the procedure of the invention provides for detecting the point wherein the ABT reaches its full capacity. By use of these procedural steps, in accordance with the invention, the adaptive load generation frees a user of the system 10 from the burden of conducting the simulation.

The adaptive load generation procedure makes use of an existing web loading program, such as a product known as "WebLoad" (available from RadView Software, Inc., Lexington, Mass.), for the stress testing of applications. The WebLoad product employs the elements shown in FIG. 1, namely, the load generator 12, the Central Console 18, and the probing client 16. The load generator 12 is a multi-threaded application that is able to simulate the behavior of multiple clients. Each simulated client is implemented as a separate thread, generating HTTP request according to a predefined set of instructions called a "test script".

Several measurements of a web application's performance are taken while each thread, of each of the respective clients, is running. Such measurements may include response time and throughput rate. These measurements are collected from all threads and packed together to a statistics report. Several other measurements are calculated based on the work of all threads, such as the number of successful TPS, and are added to the other measurements in the statistics report. The compilation of data and generation of such reports is well known. These reports are sent to the Central Console 18 every several seconds (as determined by the user), achieving a real-time reporting of the performance of the web application.

The probing client 16 shares the same functionality as one load generator 12, but implements only one simulated client. The measurements taken from the probing client 16 are more accurate than those of the load generators 12 because there is only one probing client per Probing Client machine, and the resources of the machine are devoted to this simulated client.

Also, in each of the load generators 12, the measurements sent are the averages of the measurements taken from all the simulated clients running on a Load Generator machine. In the manner of one of the load generators 12, the machine of the probing client 16 reports every several seconds to the Central Console 18. The Central Console 18 acts as a main control point for the load generators 12 and the probing client 16, wherein it is set forth how many load generators 12 and how many simulated clients may be activated in any given time during a test session. The Central Console 18 is able to start and to stop each of the load generators 12, and to change the number of simulated clients during a running of the load generators 12. The monitor 18 also collects the statistics reports sent from the load generators 12 and from the probing client, and stores the reports in a statistics database for reporting and for analysis. The ability of the system 10 to change the load size dynamically during a test session, and also the fact that the results are received in real time during the test, are an important feature of the performance measurement procedure with the adaptive load generation system 10.

Figure 2:
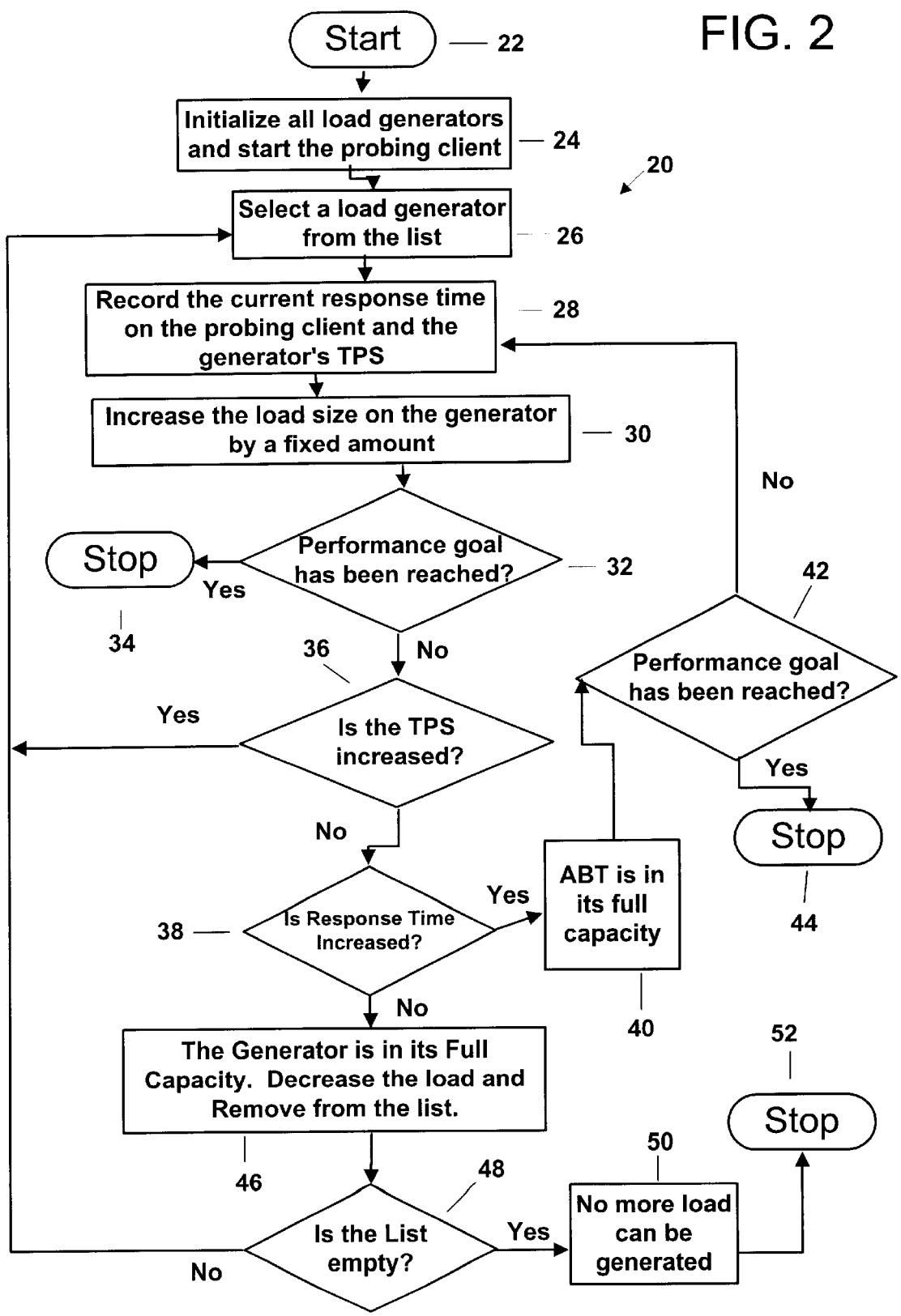
FIG. 2 is a block diagram showing the procedure of the invention.

With reference to FIG. 2, the procedure 20 for operation of the system 10 in accordance with the invention is depicted as a set of procedural steps represented by blocks in the diagram. The procedure begins at 22 after which there is initialization of the load generators and an activating of the probing client, as shown at block 24. At block 26, a load generator is selected from a list of available generators 12 (FIG. 1). The TPS generated from the selected generator, together with the corresponding response time measured on the probing client 16, are recorded and stored as shown at block 28.

Then, at block 30, the load size is increased for the generator by the generator by a predefined amount. At this point, at block 32, a decision is made as to whether the performance goal of the web application has been reached. In the event that the performance goal has been reached, then it is understood there is no further performance to be gained from the web application, and the procedure is stopped at 34. In the event that the performance goal of the web application has not been reached, the procedure advances to block 36. Therein, after a delay which allows the generator 10 to complete the load increase, and the Central Console to collect a fresh statistics report from the generator and the probing client, the TPS is compared to the value of TPS which was stored previously prior to the step of the operation.

If the TPS has increased, this is an indication that the increase in load size has increased also the effective load on the ABT. Therefore, one can continue using the present load generator. Accordingly, the procedure reverts back to block 26 wherein the load generator is selected, and thereafter the procedure continues into block 28. If there has been no increase in the TPS, then the procedure advances to block 38 which provides for a measurement of the response time of the web application in response to a request by the probing client 16.

If the measurement of response time indicates an increase in the response time, then the procedure advances to block 40 wherein it is concluded that the increase in response time is due to the fact that the ABT can not respond to more requests without interfering with the processing of requests of other clients machines. Thus, the ABT is considered to have reached its full capacity. At this point in the procedure, a further check is made at block 42 to determine if the performance goal of the web application has been reached. If the performance goal of the web application has been reached, then the procedure terminates at 44. On the other hand, if the performance goal of the web application has not been reached, then the procedure reverts to block 28 in which further measurements are employed to verify whether or not the ABT has, in fact, reached its full capacity.

In the event that the measurement of response time, at block 38, does not show an increase in the response time, the procedure advances to block 46 where it is concluded that the assumed increasing of loading of the web application by the load generator 10 has, in fact, not occurred because the generator is, apparently, in its state of full capacity. Thus, there has, in fact, been no effective load change. Accordingly, at block 46, the load size generated by the load generator 10 is decreased back to the point where the generator was effective. This generator is then removed from the list of generators available for incrementing the load size.

Thereupon, at block 48, a determination is made as to whether the list of available load generators 12 is empty. In the event that the answer is affirmative, that there are no more load generators available, at block 50, then the procedure terminates at 52 because the maximum amount of loading of the web application 14 by the system 10 has been done. The system 10 has reached its full ability to generate load, and the test is completed. However, at block 48, in the event that the list is not empty, there is at least one more load generator 12 available for loading the web application 14. Then the procedure reverts back to block 26 wherein a further one of the load generators 12 is selected for loading the web application 14.

The procedure advances through blocks 28 and 30 for further loading and measurement of the results of the loading. With respect to block 40, it is noted that one criteria for determining that the ABT is in a state of full capacity is that the response time exceeds three seconds, by way of example. Thus, following block 42, even though the ABT is considered to be in its full state of capacity based on the response time of three seconds, one can still continue with the test to determine the web application performance for a response time of four seconds, by way of example.

The foregoing procedure wherein the adaptive load generation provides for a constant monitoring of a web application during an increasing of the load size effects not only the web application but also the load generators and the communication layer that connects the web application to the load generators. In summarizing the foregoing procedure, it is noted that the adaptive mode generation enables a decision to be made when a given load generator has reached its full capacity, followed by a continuing of the test procedure with another one of the load generators. The foregoing monitoring procedure also enables one to determine that the ABT has reached its full capacity in accordance with a specific criteria such as TPS, response time or CPU (Central processing unit) utilization, by way of example. The monitoring information can be collected from the load generators, the ABT, and also from the probing claim 16 for which the probing client machine initiates a single client accessing the web application.

In view of the foregoing description of the process of the invention, it is apparent that the adaptive load generation enables a user of the system of FIG. 1 to determine automatically the status of the system, and thereby maximize utility of the web application in responding to requests of client machines.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A computer based method for load testing a web application to determine the web application's full capacity, comprising the steps of:

(a) selecting at least one load generator from a plurality of load generators to generate a load on said web application;

(b) measuring transactions per second (TPS) in real-time by said at least one load generator and application response time (ART) in real-time by a probing client;

(c) controlling said at least one load generator to dynamically increase said load on said web application;

(d) measuring said TPS and said ART in real-time by said at least one load generator and said probing client, respectively, to determine if said TPS and/or said ART increased with said load increase;

(e) selecting another load generator from said plurality of load generators to dynamically increase said load on said web application by a pre-determined amount if it is determined that said TPS and said ART did not increase with said load increase, thereby indicating that said at least one load generator is at full capacity and unable to dynamically increase said load by said pre-determined amount;

(f) repeating steps (b) to (e) if it is determined that said TPS and said ART increased with said load increase; and (g) terminating said load testing if it is determined that said ART increased but not said TPS with said load increase, thereby determining said full capacity of said web application.

2. The computer based method of claim 1, wherein the step of controlling dynamically increases said load in said web application by a pre-determined amount.

3. The computer based method of claim 1, wherein each load generator simulates a plurality of clients accessing said web application; and wherein said at least one load generator increases the number of simulated clients to dynamically increase said load on said web application.

4. The computer based method of claim 1, further comprising the step of providing said TPS and said ART measurements in real-time to an operator.

* * * * *